(12) United States Patent
Chung

(10) Patent No.: US 7,545,162 B2
(45) Date of Patent: Jun. 9, 2009

(54) METHOD AND APPARATUS FOR INSPECTING AND REPAIRING LIQUID CRYSTAL DISPLAY DEVICE

(75) Inventor: Han Rok Chung, Daegu-kwangyeokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/847,288

(22) Filed: May 18, 2004

(65) Prior Publication Data
US 2004/0239364 A1    Dec. 2, 2004

(30) Foreign Application Priority Data
Jun. 2, 2003    (KR) .................... 10-2003-0035341

(51) Int. Cl.
*G01R 31/00* (2006.01)

(52) U.S. Cl. ........................................ 324/770

(58) Field of Classification Search ............... 324/770, 324/765, 158.1, 529, 760; 349/192; 702/59; 257/48; 438/14–18
See application file for complete search history.

(56) References Cited

U.S. PATENT DOCUMENTS 5,073,754 A * 12/1991 Henley .................. 324/529
5,734,158 A * 3/1998 Nagashima et al. ......... 250/225
5,740,272 A * 4/1998 Shimada .................... 382/149
6,107,806 A * 8/2000 Field ......................... 324/529
6,429,897 B2 * 8/2002 Derndinger et al. ......... 348/295
6,853,364 B2 * 2/2005 Kai et al. .................... 345/100
2003/0117164 A1   6/2003 Fujii et al.

FOREIGN PATENT DOCUMENTS

JP    2000055964 A  *  2/2000

* cited by examiner

*Primary Examiner*—Ha Tran Nguyen
*Assistant Examiner*—Tung X Nguyen
(74) *Attorney, Agent, or Firm*—McKenna Long & Aldridge LLP

(57) ABSTRACT

An apparatus of inspecting a liquid crystal display device includes a magnetic sensor scanning a signal line pattern on a substrate to detect a defective position of the signal line pattern, a camera imaging the signal line pattern detected by the magnetic sensor, an inspecting jig contacting a probe pin with the signal line pattern to determine the existence of defective in the signal line pattern, a transferring tool system transferring at least one of the substrate, the magnetic sensor and the camera in a two-axis direction, and a controller controlling the magnetic sensor, the camera, the inspecting jig and the transferring tool system.

3 Claims, 12 Drawing Sheets

FIG.8
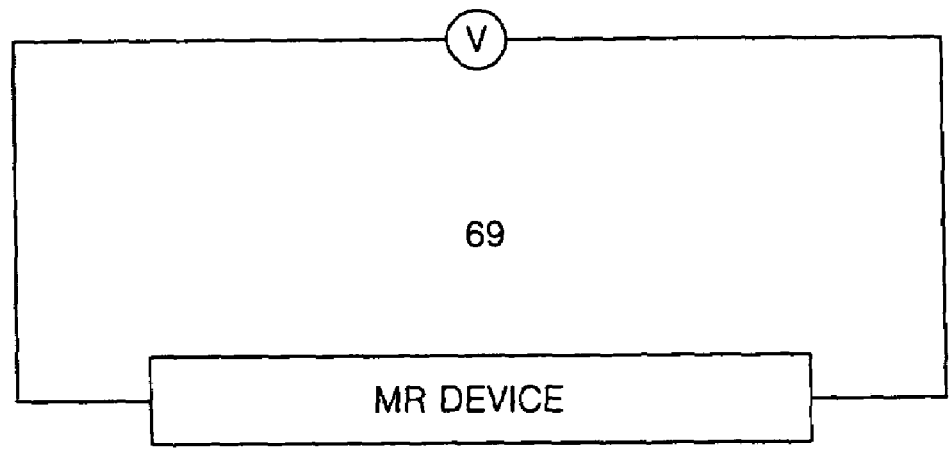
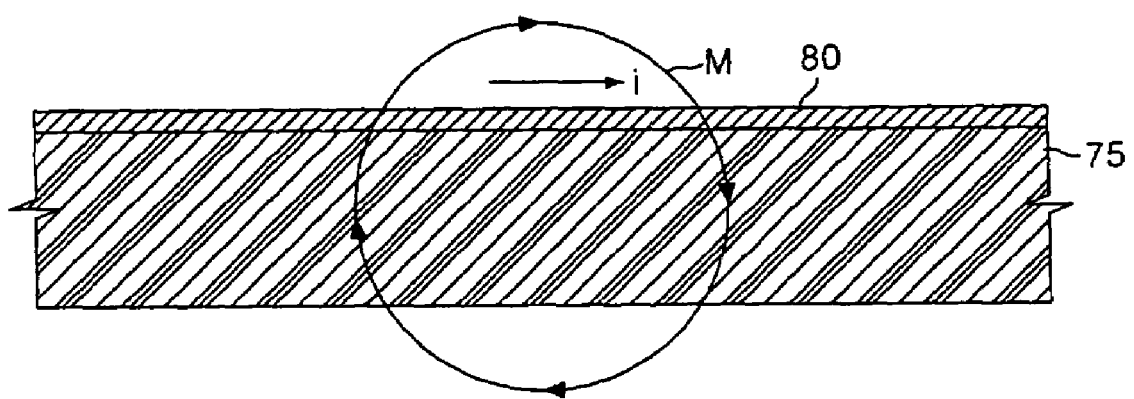

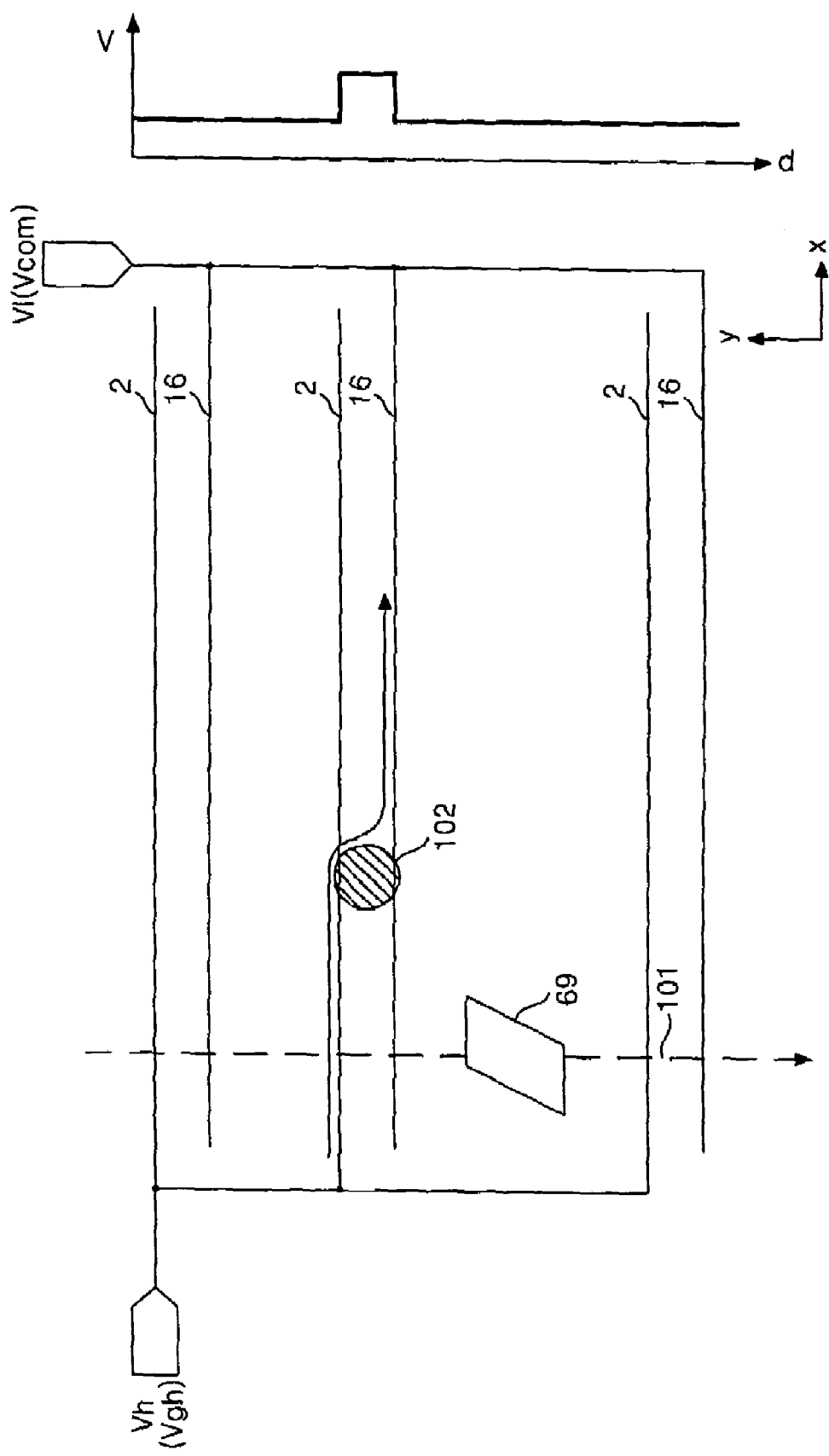

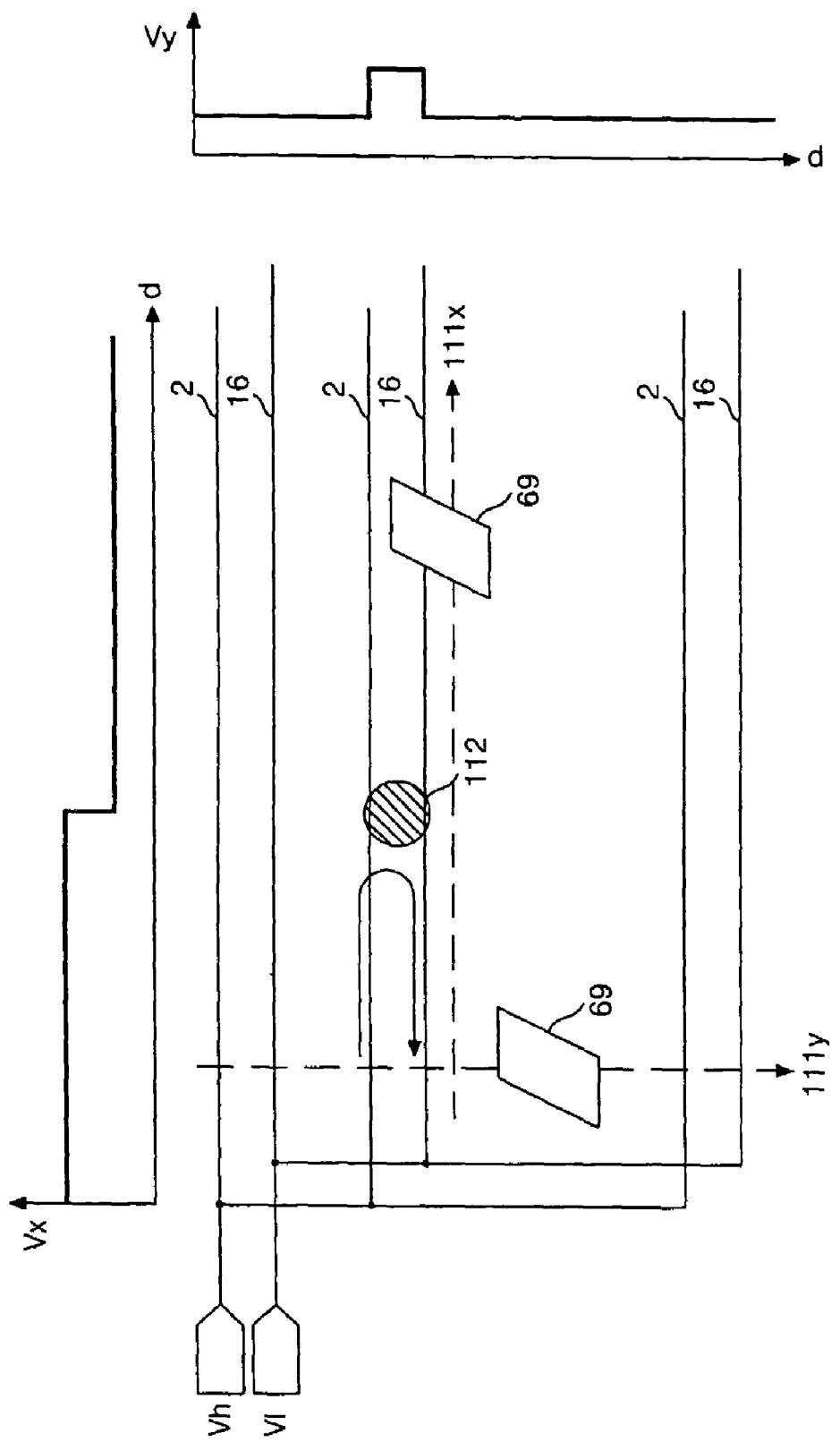

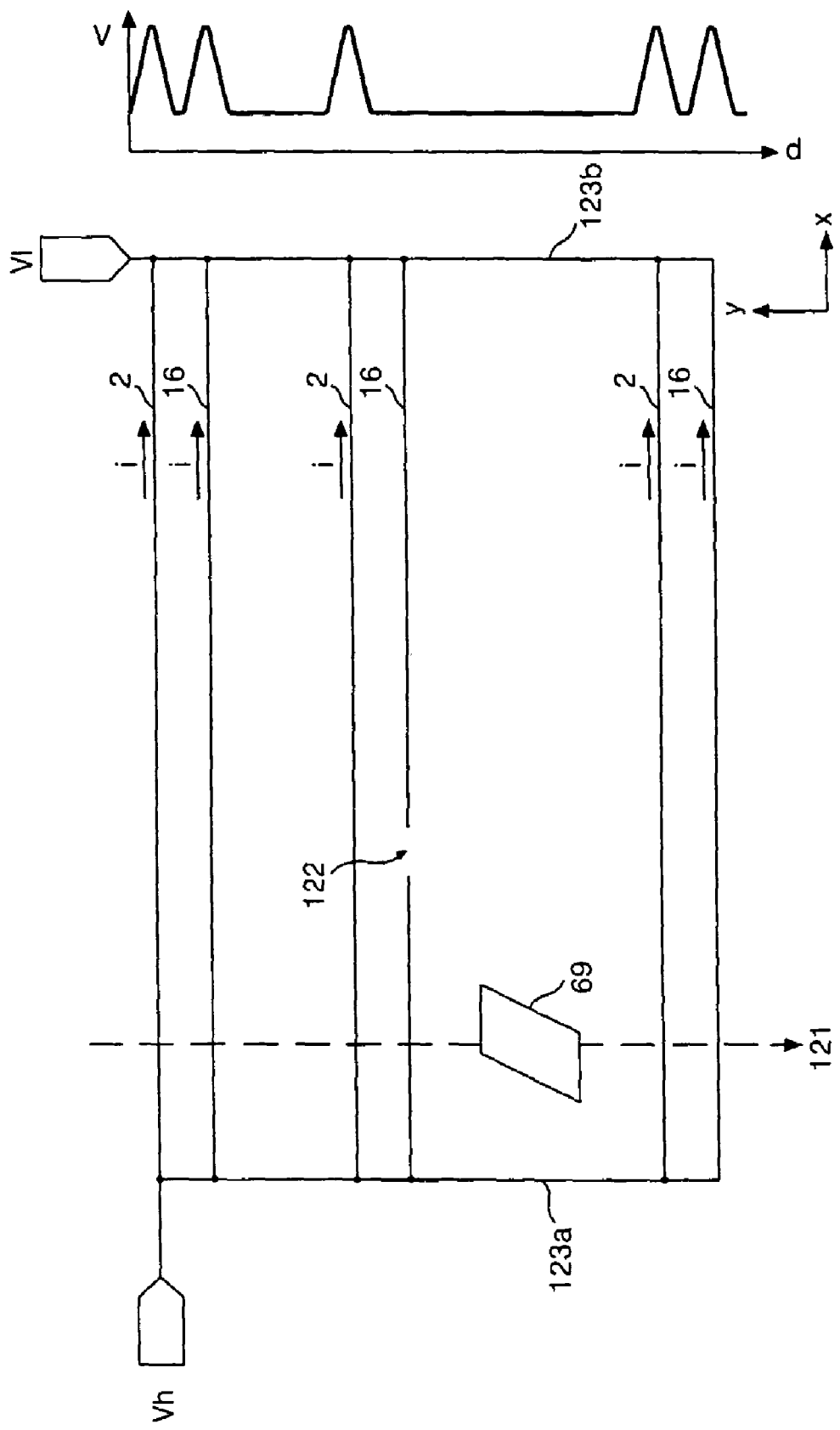

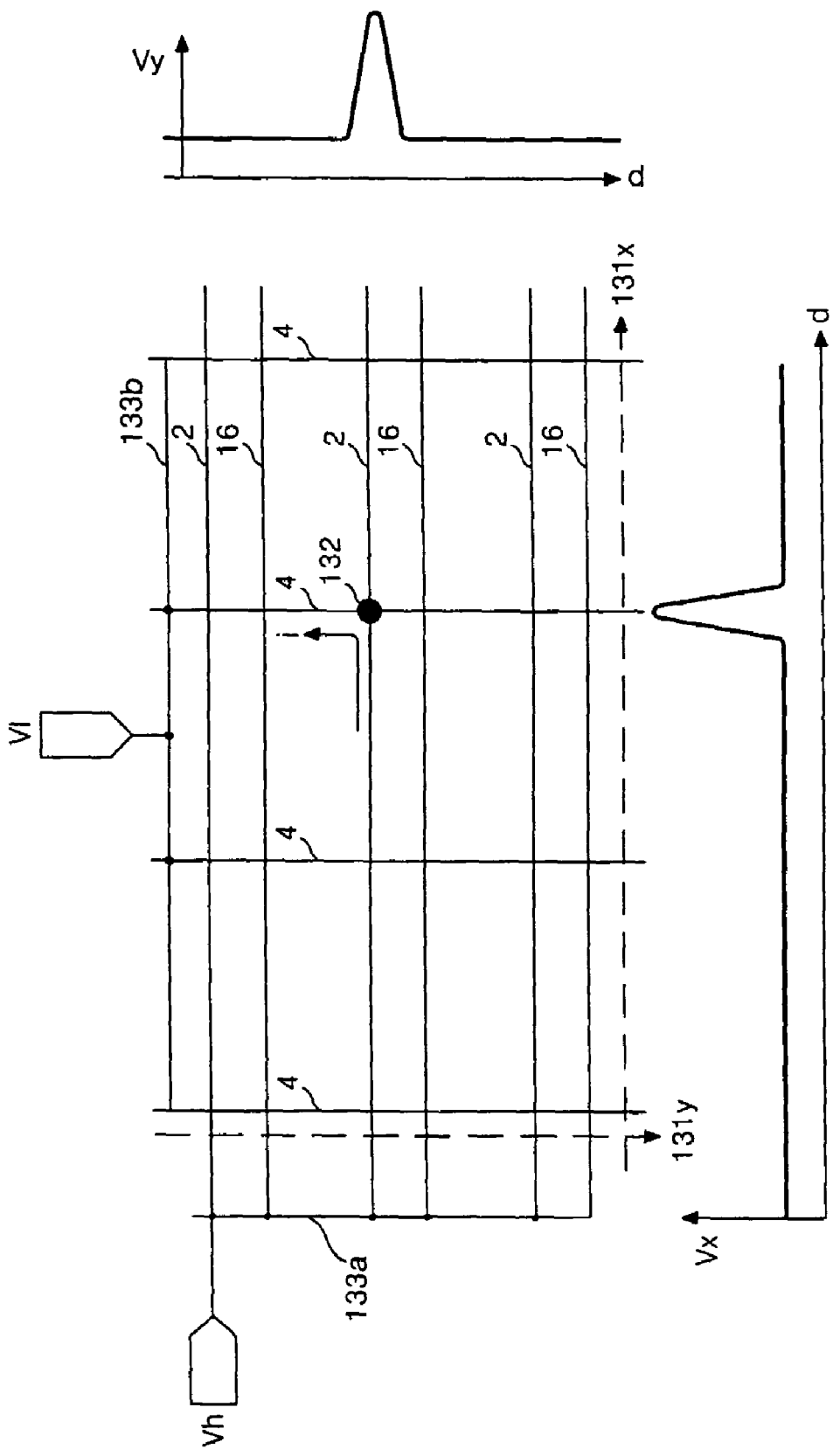

METHOD AND APPARATUS FOR INSPECTING AND REPAIRING LIQUID CRYSTAL DISPLAY DEVICE

The present invention claims the benefit of the Korean Patent Application No. P2003-35341 filed in Korea on Jun. 2, 2003, which is hereby incorporated by reference.

BACKGROUND OF THE INVENTION

1. Field of the Invention

The present invention relates to a liquid crystal display device, and more particularly, an apparatus and a method for inspecting and repairing a liquid crystal display device capable of reducing a defective rate and increasing production efficiency and yield of the liquid crystal display device.

2. Description of the Related Art

Generally, liquid crystal displays (LCDs) control an electric field supplied to a liquid crystal cell to thereby control light transmittance of liquid crystal material for displaying a desired picture. The liquid crystal displays are classified into a vertical electric field type and a horizontal electric field type in accordance with a direction of the electric field driving the liquid crystal.

The liquid crystal display of vertical electric field type has a common electrode and a pixel electrode formed on an upper substrate and a lower substrate, respectively, such that a vertical electric field is formed in the liquid crystal cell by a voltage applied to the common electrode and the pixel electrode. The liquid crystal display of vertical electric field type has a higher aperture ratio but a narrower viewing angle.

The liquid crystal display of horizontal electric field type has a common electrode and a pixel electrode formed on a same substrate, such that a horizontal electric field is formed to the liquid crystal cell by a voltage applied to the common electrode and the pixel electrode. The liquid crystal display of horizontal electric field type has a wider viewing angle of about 160°. An example of the liquid crystal display of horizontal electric field type is a liquid crystal display device of in-plane switching (hereinafter referred to as "IPS") mode.

FIG. 1 is a plan view showing a portion of signal lines and a thin film transistor formed on a lower substrate in a liquid crystal display device of in-plane switching (IPS) mode according to the related art, and FIG. 2 is a sectional view of the lower substrate taken along the lines I-I' and II-II' in FIG. 1. In FIGS. 1 and 2, the liquid crystal display device of the IPS mode comprises a gate line 2 and a data line 4 with a gate insulating film 46 therebetween formed on a lower glass substrate 45 in such a manner to intersect each other, a thin film transistor (TFT) 6 formed at each intersection of the gate line 2 and data line 4, a pixel electrode 14 connected to a drain electrode 12 of the TFT 6, a common electrode 18 alternatively arranged with the pixel electrode 14 on an identical plane, a common voltage line 16 commonly connected to a plurality of common electrodes 18, and a storage capacitor 20 to maintain a pixel voltage. The liquid crystal display device further comprises an upper substrate having a color filter (not shown), a black matrix and an upper polarizer formed thereon. In addition, liquid crystal materials are injected between the lower substrate and the upper substrate.

The gate electrode 8 of the TFT 6 is connected to the gate line 2, and a scan pulse is supplied to the gate line 2. In an edge of the gate line 2, a gate pad 24, which is connected to an output terminal for the scan pulse in a gate driving circuit, is linked. A source electrode of the TFT 6 is connected to the data line 4, and a data voltage, that is supplied to the pixel electrode 14 of the liquid crystal cell, is applied to the data line 4. In an edge of the data line 4, a data pad 30, which is connected to an output terminal for data voltage in a data driving circuit (not shown), is linked.

The TFT 6, in response to a scan voltage of the gate line 2, supplies the data voltage to the pixel electrode 14. The TFT 6 comprises a gate electrode 8, a source electrode 10, a drain electrode 12, an active layer 48 for forming a channel between the source electrode 10 and the drain electrode 12, and an ohmic contact layer 50 for making an ohmic contact between the active layer 48 and source/drain electrodes 10 and 12.

The pixel electrode 14 is connected to the drain electrode 12 of the TFT 6 via a first contact hole 13 passing through a passivation film 52. The pixel electrode 14 is connected to the drain electrode 12 at its one side and includes a first horizontal part 14A connected to the drain electrode 12 and formed in parallel with its adjacent gate line 2 and a second horizontal part 14B formed to overlap with the common voltage line 16, and a finger part 14C formed in parallel with the data line between the first and the second horizontal parts 14A and 14B.

The common electrode 18 is extended in parallel with the data line 4 from the common voltage line 16 such that it is alternatively arranged with a finger part 14C of the pixel electrode 14 on an identical plane. The common electrode 18 is separated from the pixel electrode 14 by a predetermined distance.

If the data voltage is supplied to the data line 4, a common voltage is supplies to the common voltage line 16 and the common electrode 18, and the scan voltage is supplied to the gate line 2, then the TFT is turned-on and the data voltage is supplied to the pixel electrode 14 via the source electrode 10 and the drain electrode 12 of the TFT 6. At this time, an electric field is supplied between the pixel electrode 14 and the common electrode 18, the electric field being substantially drawn to a horizontal direction. The liquid crystal molecules, in response to the horizontal electric field, is rotated due to a dielectric anisotropy to thereby modulate light.

The storage capacitor 20 includes a dielectric layer, which has a gate insulating film 46, the active layer 48 and the ohmic contact layer 50, a storage electrode 22 and the common voltage line 16 facing each other with the dielectric layer therebetween, and the pixel electrode 14 connected to the storage electrode 22 via a second contact hole 21 passing through the passivation film 52.

The gate pad 24 includes a lower gate pad electrode 26 formed at the edge of the gate line 2 and an upper gate pad electrode 28 connected to the lower gate pad electrode 26 via a third contact hole 27 passing through the gate insulating film 46 and the passivation film 52.

The data pad 30 includes a lower data pad electrode 32 formed at the edge of the data line 4 and an upper data pad electrode 34 connected to the lower data pad electrode 32 via a fourth contact hole 33 passing through the passivation film 52.

A common pad 36 includes a lower common pad electrode 38 formed at the edge of the common voltage line 16 and an upper common pad electrode 40 connected to the lower common pad electrode 38 via a fifth contact hole 39 passing through the passivation film 52.

FIG. 3 is a flow chart of an inspecting process and a repairing process of the liquid crystal display device of FIGS. 1 and 2 according to the related art. In FIG. 3, at steps S1 and S2, the lower glass substrate 45 is taken from the cassette and is inspected on a short circuit of the gate line 8 and the common electrode 18 thereof using an inspecting jig, as shown in FIG. 4 (to be described later).

At step S3, if the substrate 45 is determined to have a good-quality at the step S2, that is, the lower glass substrate 45 in which the gate line 2 and the common voltage line 16 are not shorted, the substrate 45 is transferred to a next process. On the other hand, at step S6, a defective substrate 45 having a short between adjacent the gate line 2 and the common voltage line 16, as determined at the step S2, is returned to a photo-rework process. The photo-rework process is operated in a photo equipment of a mask process on the defective substrate 45. The photo-rework process includes a photoresist applying process, an arrangement process of a mask, an exposure process, a development process, and a wet etching process, and is carried out again to pattern the gate line 2, the gate electrode 8, the lower gate pad electrode 26, the common voltage line 16, the common electrode 18 and the lower common pad electrode 38.

Alternatively, at step S5, the defective substrates 45, as determined at the step S2, may be repaired through the processes of a pattern inspecting process to closely inspect the patterns of the gate line 2 and the common voltage line 16 along their patterns through the use of a microscope. In addition, at step S7, a laser repairing process is performed to open a short point determined at the pattern inspecting process of step S5 using a laser beam. The substrate 45 after the pattern inspecting process of step S5 can be returned to the photo-rework process of the step S6.

FIG. 4 is a schematic circuit view representing an inspecting jig. In FIG. 4, a measuring multi-meter 201 is controlled by a personal computer (PC) 202 and a plurality of switches SWs supplying voltages supplied from the measuring multi-meter 201 to probe pins 205. In addition, the inspecting jig further includes a driving circuit board (not shown) for supplying an inspecting voltage to the gate line 2 and the common voltage line 16 via a shorting bar provided on the lower glass substrate 45 (not shown). The switches SWs are formed on a relay matrix board and are connected between output lines 203 of the measuring multi-meter 201 and input lines 206 of the probe pins 205, to thereby switch a signal transmission between the measuring multi-meter 201 and the probe pins 205.

The probe pins 205 are fixed on a probe block 204 that is capable of rising and falling. The controlling PC 202 provides a measured data supplied from the measuring multi-meter 201 to a display device (not shown). Moreover, the controlling PC 202 supplies commands required for the inspection, such as an operator's command, through the use of input devices, for example, a keyboard or a mouse, a switch controlling command for controlling the switches, and a command for rising and falling the probe block 204 supporting the probe pins 205 to the driving circuit board of the inspecting jig.

When the lower glass substrate 45 is loaded in the inspecting jig, a testing voltage, which is supplied from the driving circuit board, is provided to the gate line 2 and the common voltage line 16 via the shorting bar. At this time, the probe pins 205 are connected to the lower gate pad electrode 26 and the lower common pad electrode 38. Then, the switches SWs are turned-on. If it is detected that the gate line 2 and the common voltage line 16 are not shorted, a resistance of the gate line 2 and the common voltage line 16 has a value higher than a predetermined reference value measured by the measuring multi-meter 201. However, if it is detected that the gate line 2 and the common voltage line 16 are shorted, a resistance of the gate line 2 and the common voltage line 16 has a value lower than a predetermined reference value due to a conductive alien substance or a defect of a photolithography process. This is because a current path is not formed between the gate line 2 and the common voltage line 16 that are not shorted, while a current path is formed between the gate line 2 and the common voltage line 15 that are shorted.

In the liquid display device of IPS mode, a distance between the gate line 2 and the adjacent common voltage line 16 is about 3 μm as shown in FIG. 1. Thus, a short between the gate line 2 and the common voltage line 16 frequently occurs in this narrow width. In particular, it has been determined that about 30% of the substrates 45 after undergoing a first mask process have a short defect and are returned to the photo-rework process. Further, because it is difficult to locate the short position rapidly and accurately by the pattern inspecting process, few defective substrates 45 are transferred to the laser repair process. Accordingly, the defective substrates are returned to the photo equipment to repeat the first mask process, thereby delaying the photolithography process and reducing production efficiency. This problem worsens with fabricating substrates having a larger size.

SUMMARY OF THE INVENTION

Accordingly, the present invention is directed to a method and apparatus for inspecting and repairing liquid crystal display device that substantially obviates one or more of the problems due to limitations and disadvantages of the related art An object of the present invention is to provide an apparatus and a method of inspecting and repairing a liquid crystal display device those are capable of reducing a defective rate and increasing production efficiency and yield of the liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for inspecting a liquid crystal display device includes scanning a signal line pattern on a substrate using a magnetic sensor to detect a defective position of the signal line pattern.

In another aspect, the method for repairing a liquid crystal display device includes scanning a signal line pattern on a substrate using a magnetic sensor to detect a defective position of the signal line pattern, generating coordinate data of the defective position, and performing a repair process on the substrate using the coordinate data.

In yet another aspect, the apparatus of inspecting a liquid crystal display device includes a magnetic sensor scanning a signal line pattern formed on a substrate to detect a defective position of the signal line pattern, and a sensor driving circuit driving the magnetic sensor and generate coordinate data of the defective position.

In another aspect, the apparatus of inspecting a liquid crystal display device includes a magnetic sensor scanning a signal line pattern on a substrate to detect a defective position of the signal line pattern, a camera imaging the signal line pattern detected by the magnetic sensor, an inspecting jig contacting a probe pin with the signal line pattern to determine the existence of defective in the signal line pattern, a transferring tool system transferring at least one of the substrate, the magnetic sensor and the camera in a two-axis direction, and a controller controlling the magnetic sensor, the camera, the inspecting jig and the transferring tool system.

In yet another aspect, the apparatus of repairing a liquid crystal display device includes a magnetic sensor scanning a signal line pattern formed on a substrate to detect a defective position of the signal line pattern, and a repairing means repairing the substrate on a basis of coordinate data of the defective position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 8 illustrates an operation of the magnetic sensor of FIG. 6;

FIGS. 9 and 10 are diagrams representing a short detecting method of a signal line using the magnetic sensor shown in FIG. 6;

FIG. 11 is a diagram representing an open detecting method of the signal line using the magnetic sensor shown in FIG. 6; and FIG. 12 is a diagram representing a method of detecting an interlayer short of the signal lines.

DETAILED DESCRIPTION OF THE PREFERRED EMBODIMENT

Reference will now be made in detail to the preferred embodiments, examples of which are illustrated in the accompanying drawings.

Figure 5:
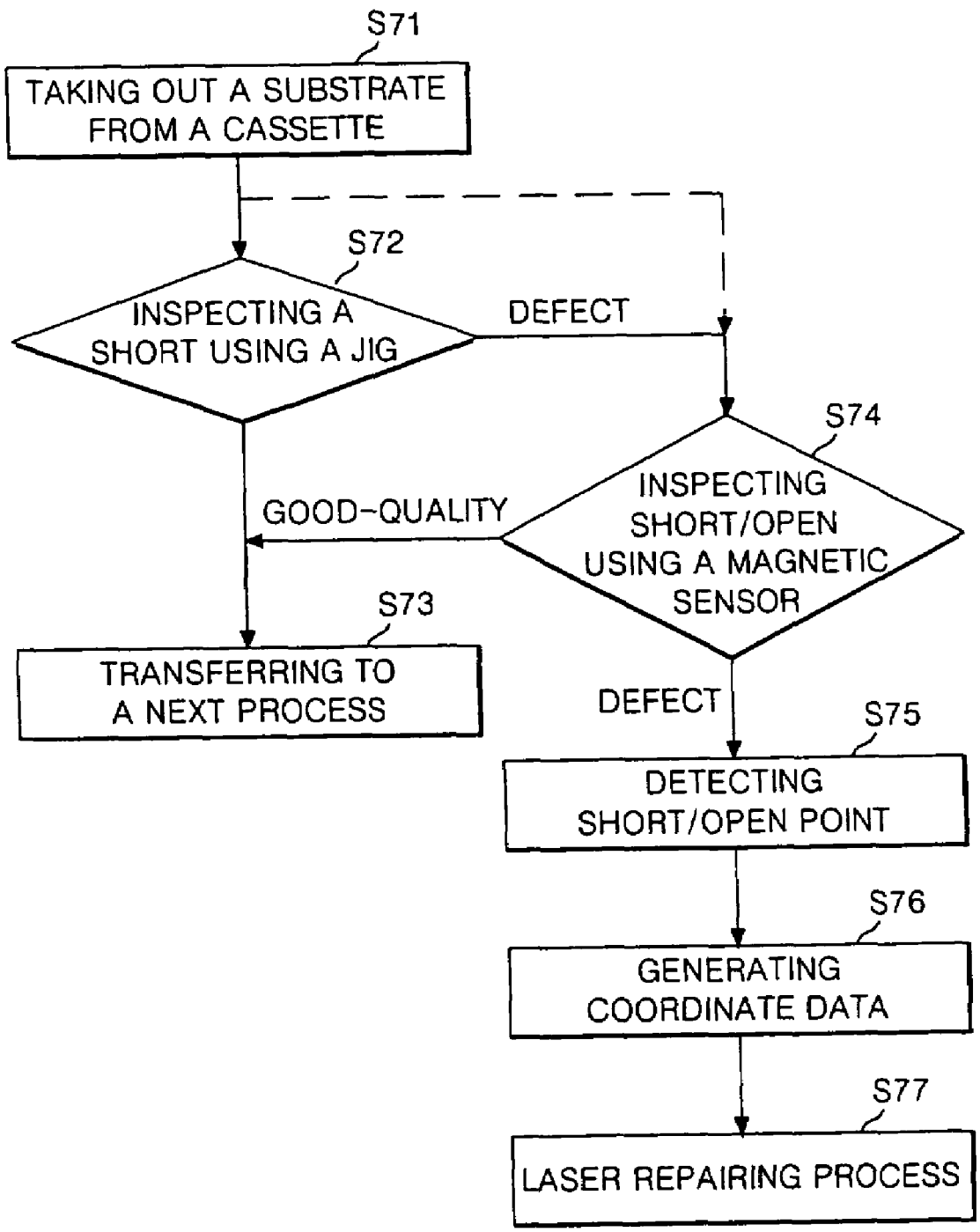
FIG. 5 illustrates a method for inspecting and repairing a liquid crystal display device according to an embodiment.

FIG. 5 illustrates a method for inspecting and repairing a liquid crystal display device according to an embodiment. In FIG. 5, at step S71, a substrate may be taken out from a cassette after the substrate has undergone a fabricating process for manufacturing a liquid crystal display device in the IPS mode. For instance, a gate line, a gate electrode, a lower gate pad electrode, a common voltage line, a common electrode and a common pad electrode may have been formed on the substrate before it is taken out from the cassette.

At step 72, the substrate may be placed on a stage and inspected using a jig. In particular, the jig may be used to detect a short/open point in a signal line formed on the substrate. If no existence of a short/open point in the signal line is detected at step S72, the substrate may be transferred to a next process at step S73.

However, if a short/open point is detected at step S72, the substrate may be further inspected using a magnetic sensor at step S74. In particular, the magnetic sensor may find that the jig mistakenly detected a short/open point at step S72, then the substrate is transferred to a next process at step S73. However, the magnetic sensor may confirm the existence of the short/open point between adjacent gate line and common voltage line, then the substrate may be considered as a defective substrate.

Alternatively, the substrate taken out from the cassette may bypass the inspection by the jig at step S72 and may be inspected directly with the magnetic sensor at step S74, as shown in the dashed line, thereby reducing inspection time.

At step S75, a line camera and/or an area camera may be moved by an automatic program or by an inspecting operator to a short/open point detected by the magnetic sensor. For example, the inspecting operator may further confirm the existence of the short/open point by visual inspection from the image(s) taken by the cameras.

At step S76, a coordinate/position of the short/open point may be generated by the camera and the magnetic sensor. At step S77, such a coordinate of the short/open point may be transmitted to a laser repair equipment which repairs the short/open point based on the detected coordinate.

Figure 6:
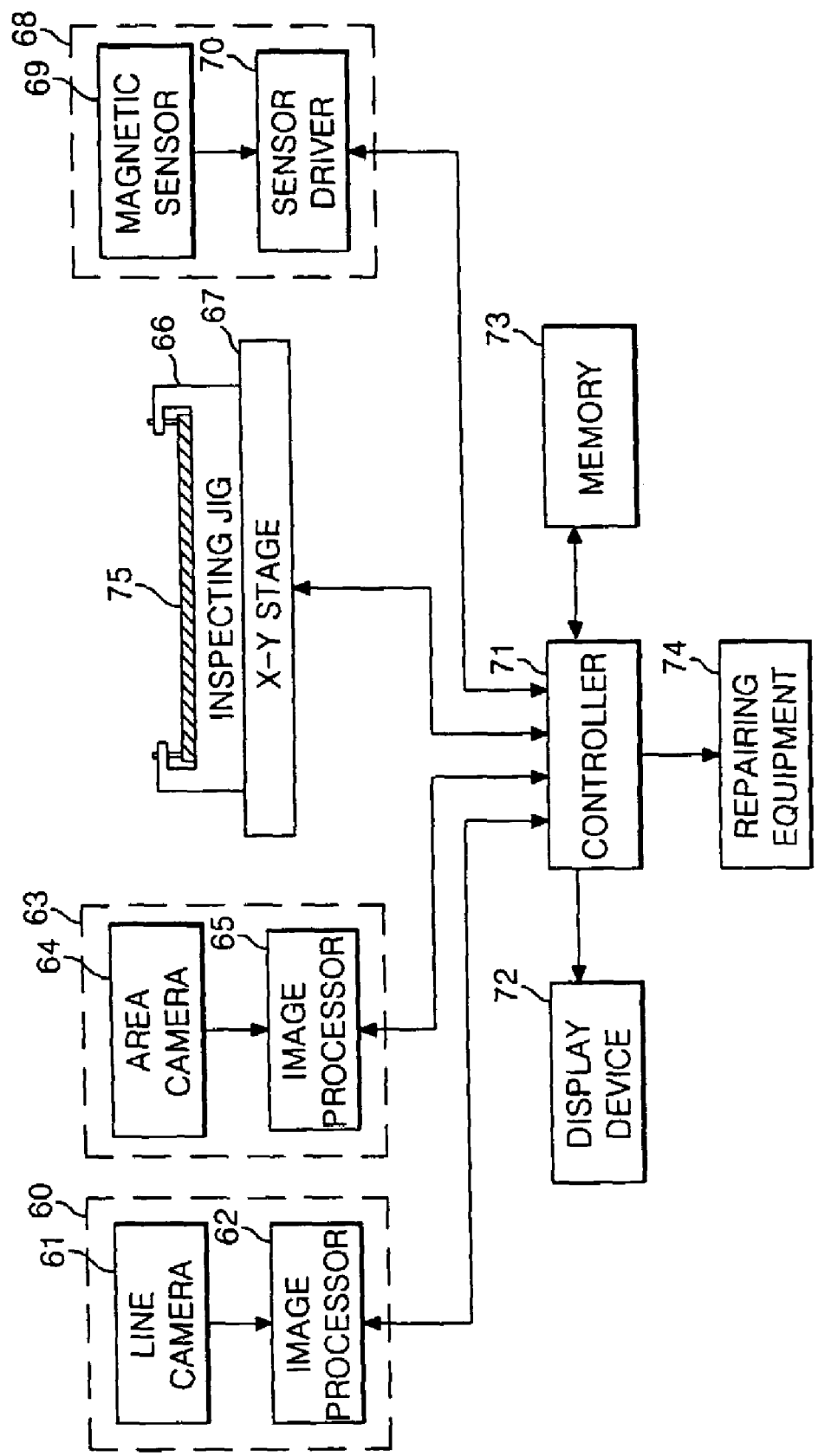
FIG. 6 is a block diagram of an apparatus for inspecting and repairing of a liquid crystal display device according to an embodiment.

FIG. 6 is a block diagram of an apparatus for inspecting and repairing of a liquid crystal display device according to an embodiment. In FIG. 6, an apparatus for inspecting a liquid crystal display device may include an X-Y stage 67 for supporting a substrate 75 thereon. The apparatus may include an inspecting jig 66 for detecting an existence of a short point in a signal line formed on the substrate 75. In particular, the inspecting jig 66 may include probe pins (not shown) for contacting pad regions of the substrate 75. A current may be applied to the pad regions through the probe pins to thereby detect a resistance of the signal line. In particular, the detected current or resistance data may be compared to a predetermined reference data to determine whether there is a short point in the signal line.

In addition, the X-Y stage 67 may move the substrate 75 along an X-axis and a Y-axis as the apparatus detects for an existence and coordinate data of a short point or an open point in the signal line. In particular, the apparatus may include a line photographing part 60 and an area photographing part 63 for collecting different sight information regarding the substrate 75 to determine the coordinate data of the short/open point. The line photographing part 60 may include a line camera 61 and a corresponding image processor 62. Further, the area photographing part 63 may include an area camera 64 and a corresponding image processor 65.

Moreover, the apparatus may include a magnetic sensor processor 68 for accurately detecting a short point or an open point in a signal line by an induction field. The magnetic sensor processor 68 may include a magnetic sensor 69 and a sensor driver 70. The apparatus may further include a display device 72 for displaying a coordinate data of the detected short/open point and a memory 73 for storing the coordinate data.

A controller 71 may be included to control the operation of the apparatus and may be connected to a repairing equipment 74 for repairing the detected short/open point in the signal line. For instance, the controller 71 may drive the X-Y stage 67 to allow the magnetic sensor 69 to be scanned the substrate 75 along the X-axis direction and the Y-axis direction. The controller 71 may determine a short point and an open point of the signal line from the sensor driver 70 and control the line photographing part 60 and the area photographing part 63 depending upon the coordinate data. Alternatively, the magnetic sensor 69, the line camera 61, and the area camera 64 may be movable along the X-axis and the Y-axis for scanning the substrate 75, while the substrate 75 is held still without having the X-Y stage 67.

Furthermore, the controller 71 may provide the coordinate data to the display device 72 or transmit the coordinate data to the repairing equipment 74 under the controls of a predetermined program or an inspecting operator. The controller 71 may transmit the coordinate data and information on the short/open point from the line photographing part 60 and the sensor processor 68 to the repairing equipment 74 by a standard communication system, such as RS-232. The repairing equipment 74 may perform a repairing process by irradiating a laser beam to the short/open point on a basis of the data supplied from the controller 71.

Figure 7:
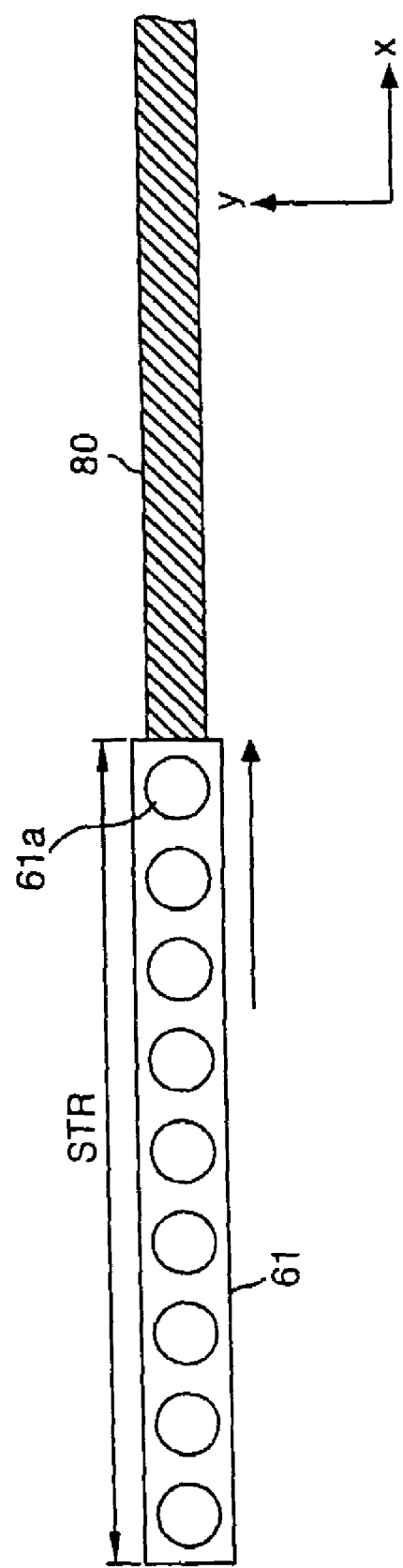
FIG. 7 illustrates a configuration of the line camera of FIG. 6.

FIG. 7 illustrates a configuration of the line camera of FIG. 6. In FIG. 7, the line photographing part 60 shown in FIG. 6 may photograph the signal line along a longitudinal direction. The line camera 61 may have a plurality of charge-coupled devices (CCDs) 61a disposed in a row for scanning a signal line 80 of the substrate 75 shown in FIG. 6 at a horizontal shifting interval (STR) along the X-axis. The line camera 61 may convert light incident from the substrate 75 to an electrical signal. The image processor 62 may receive such an electrical signal, amplify the signal, convert the signal to a digital signal, and analyze the digital signal to thereby determine the coordinate data of the short/open point based on the horizontal shifting interval (STR) and a vertical shifting distance of the line camera 61. The coordinate data and an image data photographed from the line camera 61 may then be provided to the controller 71 shown in FIG. 6 such that such data may be stored, displayed or used for a repair in accordance with a predetermined program or an inspecting operator.

In addition, the area camera 64 may include a microscope (not shown) having optical lens of high magnification and CCDs to collect a magnification of a desired area. The area camera 64 may convert an enlarged photographed image to an electrical signal and supply such signal to the image processor 65. The image processor 65 may amplify the image signal, convert the image signal to a digital signal, supply the digital data to the controller 71. The controller 71 may store the enlarged image data in the memory 73 and may provide the enlarged image data, under the controls of a predetermined program or an inspecting operator, to the display device 72, to thereby allow the inspecting operator to view the enlarged image.

FIG. 8 illustrates an operation of the magnetic sensor of FIG. 6. In FIG. 8, the magnetic sensor 69 shown in FIG. 6 may include a known magnetic sensor, such as one of a magneto-resistance (MR) sensor, a giant magneto-resistance (GMR) sensor, a fluxgate sensor and an inductive sensor. For instance, a MR sensor is a magnetic sensor detecting a variation of an electric field and an existence of a magnetic body by a change of a voltage using a magneto-resist effect device (a MR device). Generally, the MR device is formed of an indium tin (InSn) thin film of monocrystalline having a high electron mobility. If a current i flows through the signal line 80, an electric field perpendicular to the current is generated, thereby inducing a magnetic field M. The magnetic field M would then change a resistance of the MR device. Accordingly, the short/open point of the signal line 80 may be detected by detecting a change in resistance of the MR device with the voltage. A permanent magnet of the rare-earth system may be additionally adhered to the MR device to improve a sensing perception.

The sensor driver 70 may supply a driving current to the MR device of the magnetic sensor 69. In addition, the sensor driver 70 may amplify the voltage supplied from the MR device, compare it to a predetermined reference voltage, and supply a digital signal representing whether there is a short/open in the signal line to the controller 71. Moreover, the sensor driver 70 may produce a coordinate data indicating a position of a short point or an open point on a basis of a relative movement amount of the substrate 75 to the magnetic sensor 69 or a relative movement amount of the magnetic sensor 69 to the substrate 75.

Figure 1:
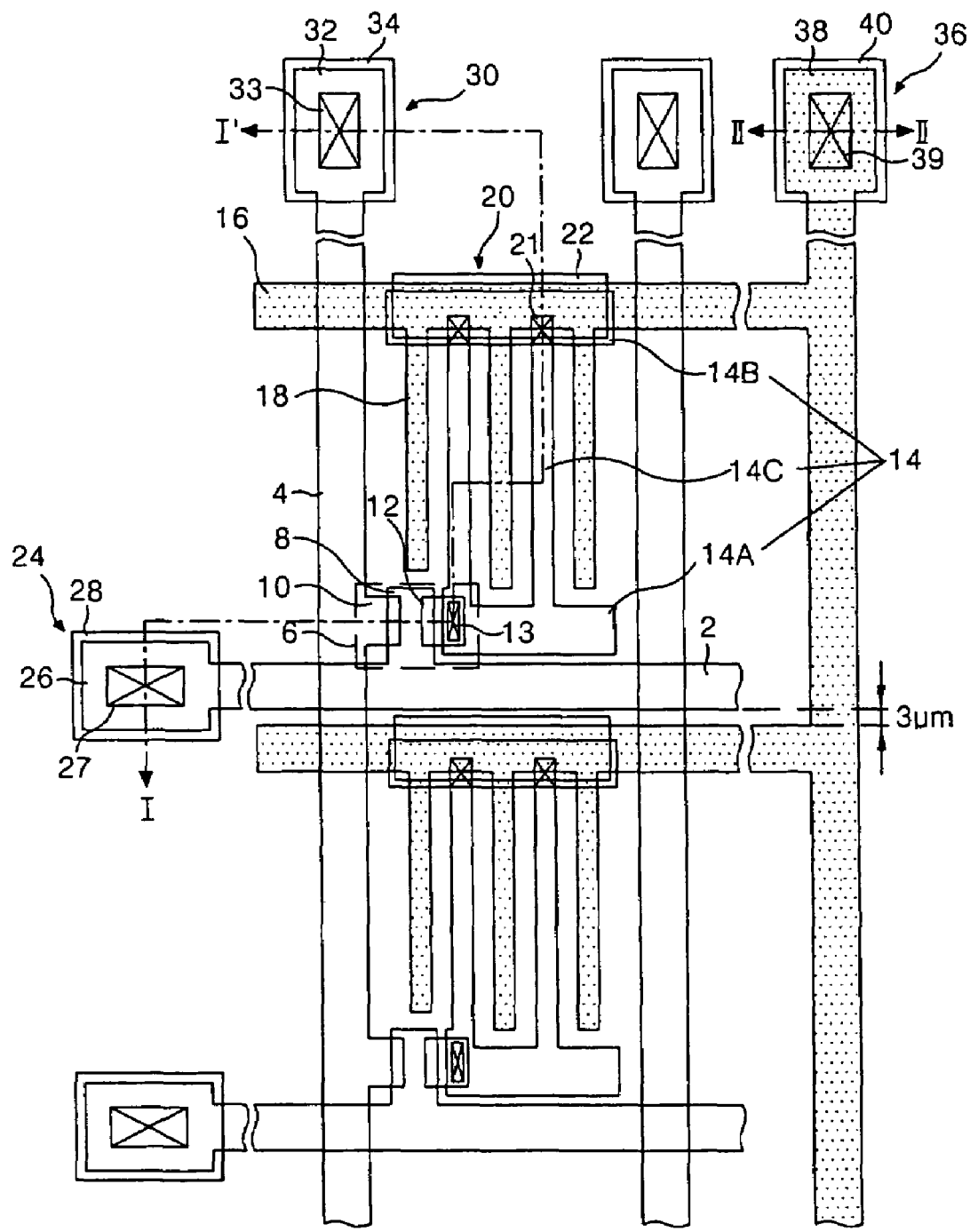
FIG. 1 is a plan view showing a portion of signal lines and a thin film transistor formed on a lower substrate in a liquid crystal display device of in-plane switching (IPS) mode according to the related art.
Figure 2:
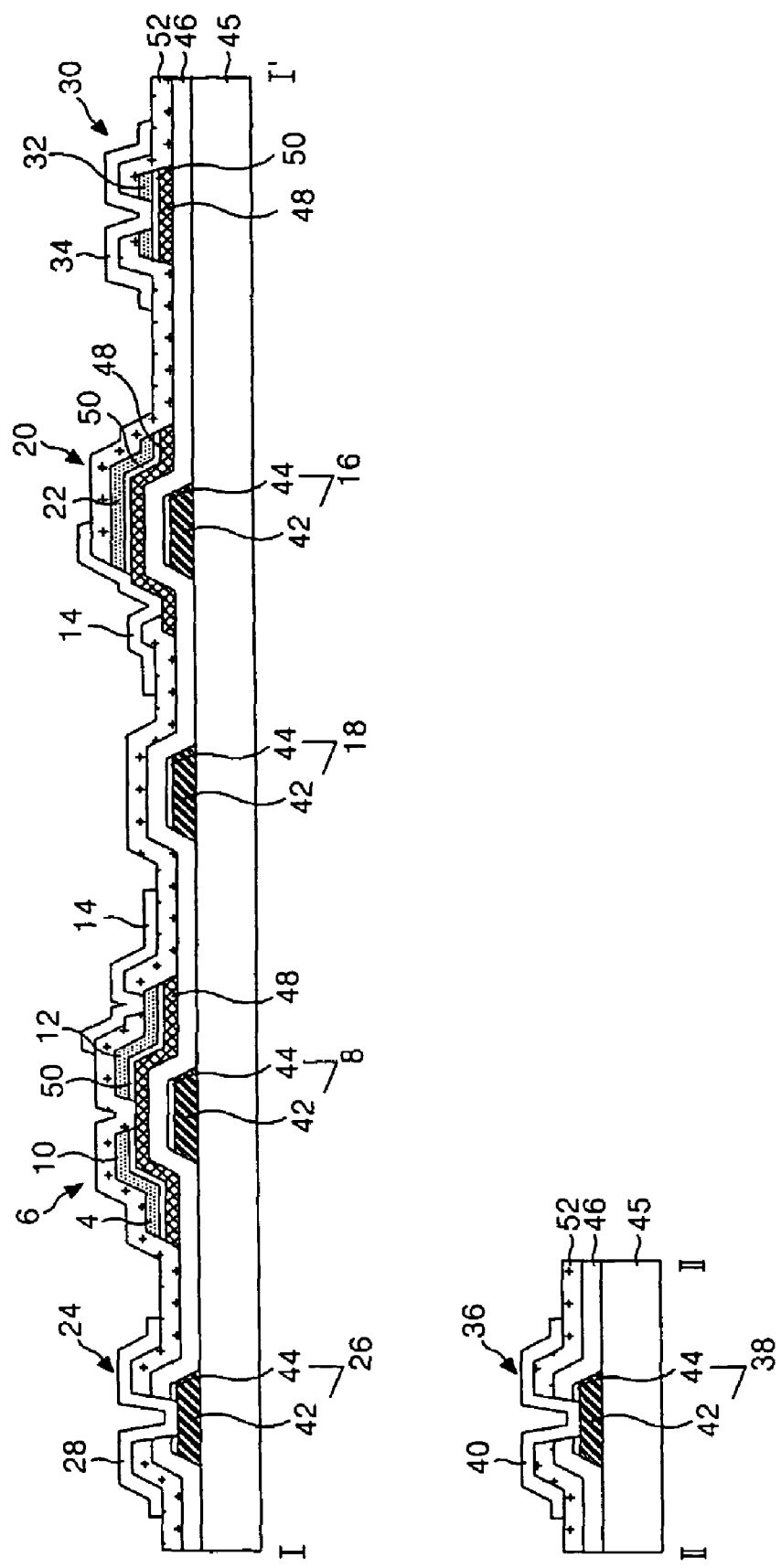
FIG. 2 is a sectional view of the lower substrate taken along the lines I-I' and II-II' in FIG. 1.
Figure 3:
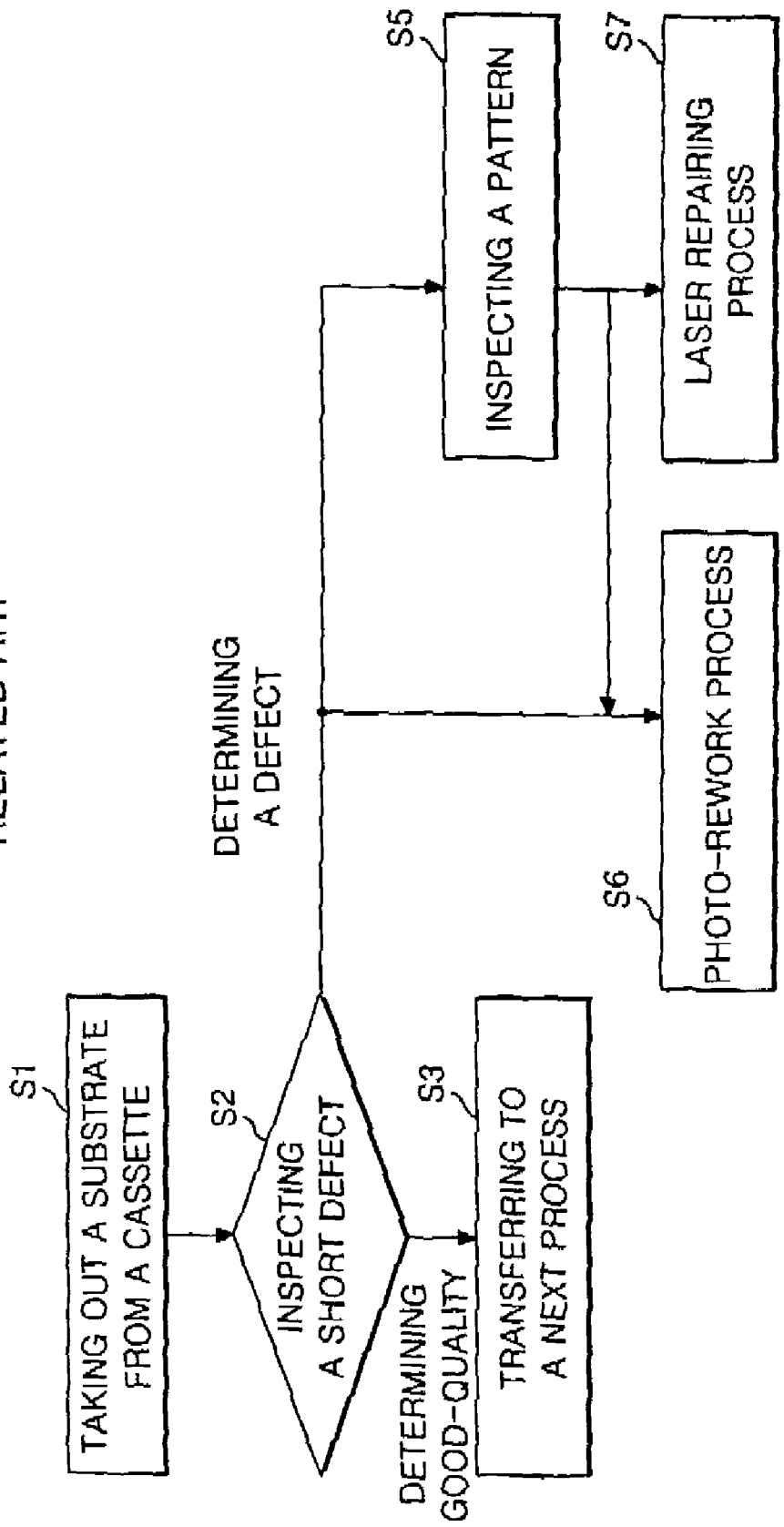
FIG. 3 is a flow chart of an inspecting process and an repairing process according to the related art.
Figure 4:
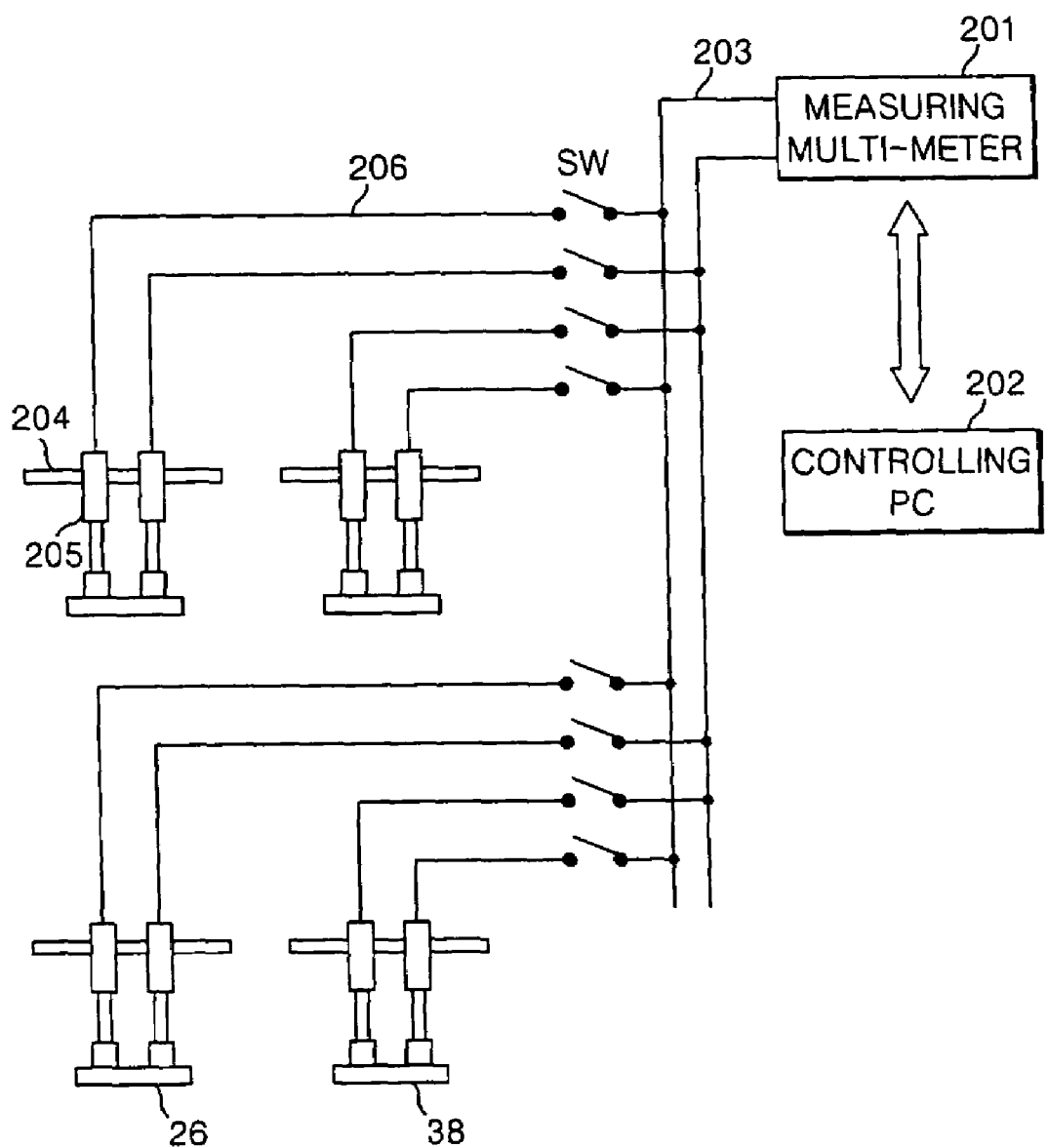
FIG. 4 is a schematic circuit view representing an inspecting jig according to the related art.

In FIGS. 9 to 12, the reference numeral 'V' represent a voltage detected by the magnetic sensor 69 and the reference numeral 'd' represents a length of the substrate. In addition, the signal line is schematically represented as a portion of the gate line 2 and the common voltage line 16 formed on the substrate 45 shown in FIG. 2.

FIGS. 9 and 10 are diagrams representing a short detecting method of a signal line using the magnetic sensor shown in FIG. 6. In FIG. 9, a high potential voltage Vh may be applied to one side of the gate line 2 and a low potential voltage V1 may be applied to an opposite side of the common voltage line 16. In addition, the high potential voltage Vh may be selected as a high gate voltage Vgh of a scan pulse and the low potential voltage V1 may be selected as a common voltage Vcom.

The magnetic sensor 69 may scan the gate line 2 and the common voltage line 16 by a non-contacting method along a width direction (shown as the dashed line along the Y-axis) across the gate line 2 and the common voltage line 16. If there is no short, no current would flow from one side to another, since no current passage is formed between the gate line 2 and the common voltage line 16. However, if there exists a shorted point 102 between the gate line 2 and the common voltage line 16 caused by a defective patterning or a foreign conductive material, then a current i would flow between the gate line 2 and the common voltage line 16, thereby causing a change in voltage V detected by the magnetic sensor 69.

In particular, a magnetic field induced by the current i at the short point 102 may induce the MR device of the magnetic sensor 69. Thus, a resistance of the MR device in the magnetic sensor 69 becomes lower by the induction magnetic field and the resistance thereof may be detected as a higher voltage. In addition, where a gate line 2 and the common voltage line 16 are not shorted, since the induction magnetic field is induced to the MR device of the magnetic sensor 69, the magnetic sensor 69 has a higher resistance. Thus, when the magnetic sensor 69 scans the gate line 2 and common voltage line 16 that are not shorted, a voltage of the magnetic sensor 69 is detected as a lower value.

Further, the controller 71 may move the line camera 61 to the short point detected by the magnetic sensor 69 and then shift the line camera 62 along a longitudinal direction of the gate line 2 and the common voltage line 16, that is, along the X-axis. If the short point 102 is detected by the line camera 61, then the image processor 62 supplies the coordinate data indicating the position of the short point 102 to the controller 71 on a basis of the movement amount of X-axis direction and Y-axis direction.

In FIG. 10, a high potential voltage Vh may be applied to one side of the gate line 2 and a low potential voltage V1 may be applied to the same side of the common voltage line 16. As the magnetic sensor 69 scans the gate line 2 and the common voltage line 16 by a non-contacting method along a width direction 111y crossing the gate line 2 and the common voltage line 16, the magnetic sensor 69 may detect a higher voltage in Vy at the short point 112. Then, the magnetic sensor 69 may be moved to scan the substrate along a longitudinal direction 111x to detect a coordinate of the short point 112. In particular, as the magnetic sensor 69 scans along the X-axis, since a current would flow through the gate line 2 and the common line 16 up to the short point 112, a change in voltage Vx may be detected by the magnetic sensor 69, thereby determining a coordinate of the short point 112 without other inspecting means.

FIG. 11 is a diagram representing an open detecting method of the signal line using the magnetic sensor shown in FIG. 6. In FIG. 11, the gate line 2 and the common voltage line 16 are shorted by shorting lines 123a and 123b or the other separate conductive means at their both sides. In addition, a high potential voltage Vh may be applied to one side of both the gate line 2 and the common voltage line 16, while a low potential voltage V1 may be applied to an opposite side of both the gate line 2 and the common voltage line 16.

The magnetic sensor 69 may scan the gate line 2 and the common voltage line 16 by a non-contacting method along a width direction 121 along the Y-axis. If there is no open point, a current i would flow from one side to another. Thus, a rise in the voltage V would be detected by the magnetic sensor 69 at each of non-defective gate line 2 and common voltage line 16. However, if there is an open point 122 in the common voltage line 16, no current would flow in the common voltage line 16. Thus, a lower voltage would be detected by the magnetic sensor 69 at the open common voltage line 16.

Further, the controller 71 may move the line camera 61 to an open line detected by the magnetic sensor 69 and then shift the line camera 62 along a longitudinal direction of the gate line 2 and the common voltage line 16, that is, along the X-axis. If the line camera 61 detects the open point 122, then the image processor 62 may supply the coordinate data indicating the position of the open point 122 to the controller 71 on a basis of the movement amount of x-axis direction and y-axis direction.

FIG. 12 is a diagram representing a method of detecting an interlayer short of the signal lines. In FIG. 12, one side of the gate line 2 and the common voltage line 16 may be shorted by shorting lines 133a or the other separate conductive means, while keeping another side of the gate line 2 and the common voltage line 16 in an electrically insulated state. In addition, one side of the data line 4 may be shorted by shorting lines 133b or the other separate conductive means, while keeping another side of the data line 4 in an electrically insulated state. A high potential voltage Vh may be applied to one sides of the gate line 2 and the common voltage line 16, and a low potential voltage V1 may be applied to the one side of the data line 4.

The magnetic sensor 69 may scan the gate line 2 and the common voltage line 16 by a non-contacting method along a width direction 121 along the Y-axis. If there is no open point, a current i would flow from one side to another. Thus, a rise in the voltage V would be detected by the magnetic sensor 69 at each of non-defective gate line 2 and common voltage line 16. However, if there is an open point 122 in the common voltage line 16, no current would flow in the common voltage line 16. Thus, a lower voltage would be detected by the magnetic sensor 69 at the open common voltage line 16.

The magnetic sensor 69 may scan the gate line 2 and the common voltage line 16 by a non-contacting method along a direction in which the gate line 2 and the data line 4 intersect, such as a scan direction 131y in the Y-axis. In such a scanning, a current (i) would flow between the gate line 2 and the common voltage line 16 in which an interlayer short point 132 exists. However, a current (i) would not flow between the gate line 2 and the common voltage line 16 in which an interlayer short point 132 does not exist. An existence of the current (i) results in a resistance change in the MR device and thus the resistance change is detected as a voltage (V).

After the interlayer short point 132 is detected in y-axis direction, the magnetic sensor 69 may scan the data line 4 by a non-contacting method along a scan direction 131x in the X-axis. In such a scanning, a current (i) would flow through the data line 4 in which an interlayer short point 132 exists, while a current (i) would not flow through the data line 4 in which the interlayer short point 132 does not exist. An existence of the current (i) causes a resistance change of the MR device, and then the resistance change is detected as a voltage (V). Accordingly, if the magnetic sensor 69 scans along the X-axis and Y-axis, then the interlayer short point is accurately detected.

The above-described apparatus and method for inspecting and repairing the liquid crystal display device of the embodiments detect a short point and an open point of the liquid crystal display device. Therefore, most of the defective substrates may be restored by the repair process and the number of substrates returned to the photo-rework process is minimized, to thereby reduce the load of the photo-rework process. In advance, the inspecting and repairing apparatus and the method enable the improvement of the detection accuracy using the line camera and the area camera, and the rapid repair process on a basis of data detected by the line camera an the magnetic sensor. As a result, it is possible to reduce a defect ratio of the liquid crystal display device and to increase a production efficiency and a productive of the liquid crystal display device.

It will be apparent to those skilled in the art that various modifications and variations can be made in the apparatus and the method for inspecting and repairing the liquid crystal display device of the present invention without departing from the spirit or scope of the invention. Thus, it is intended that the present invention cover the modifications and variations of this invention provided they come within the scope of the appended claims and their equivalents.

What is claimed is:

1. A method for inspecting a liquid crystal display device, comprising:
    scanning a signal line pattern having a gate line, a common voltage line and a data line across the gate and common voltage lines on a substrate along a width direction across the gate line and the common voltage line using a magnetic sensor to detect a defective position of a short defect, and open defect or an interlayer short defect in the signal line pattern;
    moving a line camera to the defective position detected by the magnetic sensor along the signal line pattern in vertical and horizontal directions and imaging the defection position detected by the magnetic sensor; and
    generating coordinate data of the defective position based on a movement distance of the line camera.

2. The method according to claim 1, wherein one end of the gate line, the common voltage line and the data line of the signal line pattern is shorted by a shorting line, and the other end of the gate line, the common voltage line and the data line is electrically insulated.

3. A liquid crystal display device manufactured by the method according to claim 1, comprising:
    a second substrate bonded to the substrate with a predetermined space therebetween; and
    a liquid crystal layer disposed between the substrates.

* * * * *